(No Model.) 2 Sheets—Sheet 2.
G. H. REYNOLDS.
GAS ENGINE.
No. 287,578. Patented Oct. 30, 1883.
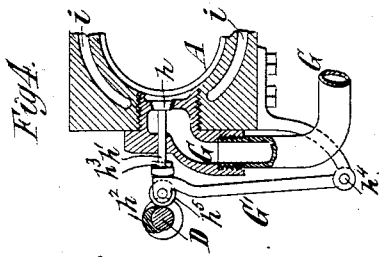
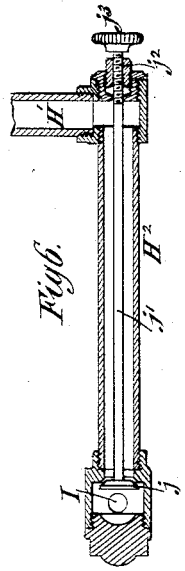
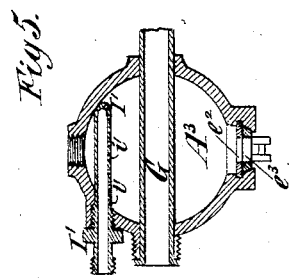
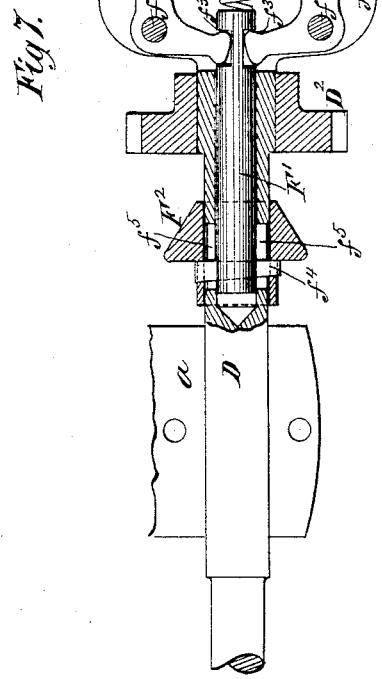
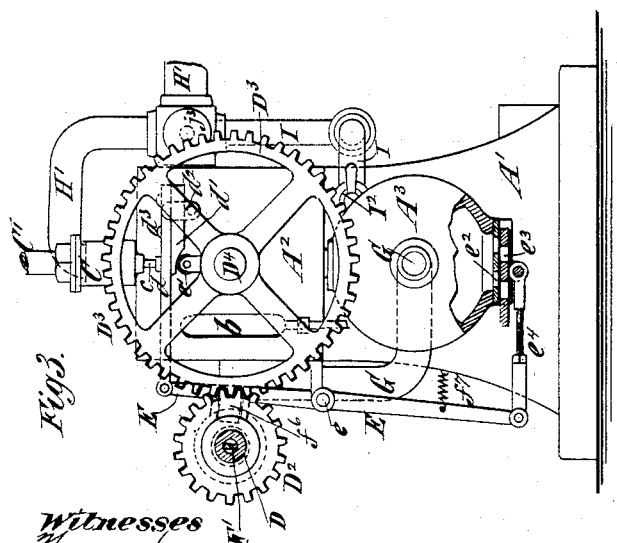
Witnesses
Fred Haynes
Ed. L. Moran
Inventor
George H. Reynolds
by his Attorneys
Brown & Brown

UNITED STATES PATENT OFFICE.

GEORGE H. REYNOLDS, OF NEW YORK, N. Y., ASSIGNOR OF ONE-HALF TO CORNELIUS H. DELAMATER, GEORGE H. ROBINSON, AND WILLIAM DELAMATER, ALL OF SAME PLACE.

GAS-ENGINE.

SPECIFICATION forming part of Letters Patent No. 287,578, dated October 30, 1883.

Application filed May 15, 1883. (No model.)

*To all whom it may concern:*

Be it known that I, GEORGE H. REYNOLDS, of the city and county of New York, in the State of New York, have invented a new and useful Improvement in Gas-Engines, of which the following is a specification.

My invention relates to that class of gas-engines in which the mixture of gas and air is exploded at each alternate revolution of the engine only, while by the two strokes of each intermediate revolution the products of combustion are expelled from the cylinder and the mixture of gas and air is taken into the cylinder.

To this end my invention includes an improvement in the method of operating these engines, which consists in heating the air, preferably by the waste products of combustion, and in saturating it with water-vapor or steam while in a heated condition and before mixing it with the gas, so that the mixture of gas and air, when admitted to the cylinder, will not only be highly heated, but will be charged with vapor, which will be further heated by the explosion, and will augment the effect of the air and gas. It is of great importance to heat the air before saturating it, as the amount of moisture which will be held in suspension by highly-heated air is many times greater than will be held in suspension by cold air.

The invention also consists in a novel manner of arranging and combining a governor with the parts through which it acts to control the gas-inlet valve, and preferably, also, an air-inlet valve; in a novel combination of parts for operating the exhaust or discharge valve; in a novel combination of parts for heating the air while at the atmospheric pressure by the waste products of combustion, and for saturating the air with water-vapor; in a novel combination of parts whereby the flow of water to and from the jacket of the cylinder is controlled and the temperature of the water in the jacket kept as nearly uniform as possible; and in other combinations of parts hereinafter described, and referred to in the claims.

In the accompanying drawings, Figure 1 is a side elevation of an engine embodying my invention. Fig. 2 is a plan thereof. Fig. 3 is an end elevation thereof, partly in section. Fig. 4 is a transverse vertical section of a portion of the cylinder, the exhaust or discharge valve, and its appurtenances. Fig. 5 is a sectional elevation of an air-reservoir through which the air is admitted and wherein it is heated and saturated with water-vapor. Fig. 6 is a sectional view of a valve and connections which control the escape of highly-heated water from the jacket; and Fig. 7 is a detail sectional view upon a larger scale, showing the construction of the governor and the mode of connecting it with its operating-shaft.

Similar letters of reference designate corresponding parts in all the figures.

A designates the cylinder, here shown as formed integral with the frame A', and wherein is a piston such as is commonly used in gas-engines of the kind above referred to. The piston is attached to a connecting-rod or pitman, B, through which it transmits motion to the crank-shaft B', upon which is mounted a fly-wheel, B², a fly-wheel being mounted on each side, if so desired.

At the back end or head of the cylinder A is a mixing chamber or channel, A², to the lower end of which is attached an air-reservoir, A³, here shown as in the form of a sphere. To the upper end of this chamber or channel A² is attached the gas-inlet valve C, which may be of any suitable construction, and which receives gas from a supply-pipe, C'.

Along the side of the engine there extends a shaft, D, which is connected with the crank-shaft B' by bevel-wheels D', so as to rotate in unison therewith. This shaft D rotates in bearings a, and at its outer end has a pinion, D², which gears into a spur-wheel, D³, mounted on a shaft, D⁴, which projects through the back of the cylinder. This is the usual shaft employed in gas-engines of this class, and carries at its inner end a disk-valve or rotary plate which controls the passage of the mixture of air and gas from the chamber or channel A² to the cylinder, and for an instant exposes the igniting-jet, which is arranged in the recess *b* at the back of the cylinder. (Shown in Fig.

F² and roller f⁶, I arrange an oil-box, F³, below the cone, and as the cone rotates its surface is kept covered with oil.

In engines of this class the governor has been heretofore arranged loosely on the shaft D⁴, on which is the cam e', and operated by a belt from the shaft D. The shaft D⁴ then moves slower than the governor, and the friction between them is sufficient to cause the belt to slip and thus impede the action of the governor. By placing the governor directly on the shaft D, I rotate it rapidly and directly, or without any belt or gearing, and I thus simplify the construction and secure a better and more sensitive action of the governor.

In the outer end of the governor socket or tube g is screwed a sleeve-nut, g', which is also internally screw-threaded, and receives through it a set-screw, g², upon which is a jam-nut, g³. Within the socket or tube g is a spring, g⁴, which bears at one end on the end of the rod or pin F' and at the other end on the sleeve-nut g', and within the spring is a rod or pin, g⁵, which forms a stop to the rod F'. The outward movement of the governor-arms F is opposed by the spring g⁴, and the rod can be moved outward by the increase of speed until its end strikes the stop-pin g⁵, whereby its outward movement is limited. The tension of the spring g⁴ can be regulated by screwing the sleeve-nut g' into or out of the socket or tube g, and the position of the stop-pin g⁵ can be varied by shifting the set-screw g² and securing it by the jam-nut g³. This arrangement of parts for setting and regulating the action of the governor is very compact and simple, and is easily accessible.

I prefer to regulate both the gas and air valves by the one governor, as it is obviously more desirable to do so; but each valve may be regulated by a separate governor without departing from my invention.

The construction of the exhaust-valve and the arrangement of mechanism for operating it are best shown in Figs. 2 and 4, but also in Fig. 1. The exhaust-pipe G is connected, as here shown, with the side of the cylinder, and the passage into it from the cylinder is controlled by an inwardly-opening valve, h, (see Fig. 4,) the stem h' of which projects outward. The valve is opened by the action of a cam, h², on the shaft D, and is closed by a spring, h³, (shown in Fig. 2.) In gas-engines as now made the cam h² acts directly on the end of the valve-stem h', and has a tendency to produce side wear or bend the stem. To obviate this defect I interpose between the stem and the cam a swinging arm, G', which is fulcrumed at h⁴, as shown in Fig. 4, and carries at its upper end a roller, h⁵. The end of the valve-stem h' bears against, but is otherwise unconnected with, the swinging arm, and hence there is no side strain on the stem.

In the gas-engines heretofore made the reservoir A³ serves simply to prevent the escape to the atmosphere of any gas which may remain in the mixing chamber or channel A², inasmuch as the gas tends to rise by reason of its specific gravity, and the reservoir affords a large space, in the upper part of which the gas remains until admitted to the cylinder. In my engine, however, the reservoir serves the additional purpose of a chamber for heating the air and saturating it with water-vapor prior to its admixture with the gas.

I have represented the exhaust-pipe G as passing through the air-reservoir A³, as best shown in Fig. 5, and the products of combustion passing through this pipe keep it at a high heat, and the radiation therefrom into the reservoir A³ heats the inflowing air before it becomes mixed with gas. By the hot air the gas is also heated, and therefore the mixture, when admitted to the cylinder, is in a hot state, and requires less heat to bring it to a proper temperature for its explosion to produce the best results.

I may obviously heat the air otherwise than by carrying the exhaust-pipe through the reservoir A³; but this arrangement would be effective, and clearly illustrates this feature of my invention.

The cylinder A comprises a jacket, i, (shown in Fig. 4,) as is common in gas-engines, and water is admitted to this jacket by a pipe, H, and escapes therefrom through a pipe, H'.

It is desirable that the water in the jacket should be as hot as possible without allowing it to rise above the boiling-point; but heretofore there has been no means provided in gas-engines for maintaining automatically a uniform high temperature of this water. The means whereby I accomplish this result are shown in Figs. 2 and 6. In the discharge-pipe H' is a straight section, H², and the passage of liquid through it is controlled by a valve, j. (See Fig. 6.) In order to permit the escape of water from the jacket i through the pipe H' and its section H², this valve j must be opened. The valve j has a long stem, j', extending through the pipe H² and projecting beyond the same. The stem is provided with a screw-thread, j², and a head, j³, whereby it may be turned to set the valve toward or from its seat. The pipe-section H² and stem j' are of different metals or materials having different degrees of expansion. For example, I make the pipe H² of iron, or a material having a low degree of expansion, and I make the valve-rod of zinc, or other metal having a high degree of expansion. The outlet of the pipe H' is sufficiently high to retain the section H² always full of water, which has escaped from the jacket, and the heat of this water, according to its temperature, produces a greater or lesser expansion and elongation of the stem j' relatively to the pipe-section H², and so holds the valve j more or less open. The valve j, while the engine is in operation, will always be more or less open, and when the water in the jacket and in the pipe H² becomes very highly heated and near or at the boiling-point the stem $j'$ is elongated to its greatest extent, and opens the valve $j$ wider to permit the water to escape more freely from the jacket, and consequently the cold water to be supplied more freely thereto. If the water in the jacket and pipe $H^2$ cools down to an undesirably low temperature, the valve-stem $j'$ contracts and more nearly closes the valve, so as to check the escape of water from the jacket, and consequently the flow of cold water into the jacket. By this means the water in the jacket may be maintained at a uniform and high temperature. Other arrangements of mechanism might, however, be employed to accomplish the same result.

From the water-discharge pipe $H'$ a pipe, I, leads to the reservoir $A^3$, and is connected with an end section, $I'$, which extends across the reservoir, above the exhaust-pipe G, as shown in Fig. 5. In the pipe I is a valve, $I^2$, (shown dotted in Fig. 2,) whereby the flow of water may be regulated. The section $I'$ is closed at the inner end, and is perforated on the under side with numerous small holes, as shown at $i'$, through which water is delivered in fine jets or streams directly onto the hot exhaust-pipe G. This water is at once converted into vapor and taken up by the heated air. The mixture of gas and air thus becomes saturated with vapor or steam, which passes into the cylinder and greatly augments the pressure produced by the explosion of the gas.

It is well known that air heated to a temperature of 200° Fahrenheit will take up and hold in suspension twenty to forty times as much water-vapor as will air of the ordinary temperature of the atmosphere, and the advantage of heating the air which is to be charged with vapor is clearly apparent. Not only does the water-vapor or steam serve to increase the power of the engine, but it serves the additional purpose of lubricating the cylinder, which is an essential feature in gas-engines, because of the great heat generated in the cylinder.

The water or vapor for saturating the mixture of gas and air may be supplied from any other source than the water-jacket.

By heating the air and saturating it with vapor or steam I increase the power of the engine while using a given quantity of gas, or produce as much power while using a less quantity of gas.

What I claim as my invention, and desire to secure by Letters Patent, is—

1. The improvement in the method of operating an engine by an explosive mixture of gas and air, consisting in heating the air and saturating it with water-vapor or steam while in a heated condition and before mixing it with the gas, substantially as and for the purpose herein described.

2. The improvement in the method of operating an engine by an explosive mixture of gas and air, consisting in heating the air by the waste products of combustion, and in saturating it with water-vapor or steam while in a heated condition and before mixing it with the gas, substantially as and for the purpose herein described.

3. The combination, in a gas-engine, of a gas-inlet valve, a shaft projecting rearward from the cylinder and carrying a cam, a side shaft geared directly with the engine crank-shaft and with the shaft carrying said cam, a governor mounted directly upon said side shaft, and devices controlled by the governor and capable of operation by the said cam for opening said gas-inlet valve, substantially as herein described.

4. The combination, with the shafts D and $D^4$, geared together, and with the gas-inlet valve C, of the lever $d$, carrying an incline or wedge, the cam $e'$ for raising said lever, and a governor mounted directly on the shaft D, and serving to shift said lever $d$ endwise, substantially as herein described.

5. The combination, with the shafts D $D^4$, geared together, and with the gas-inlet valve C, of the lever $d$, the wedge or inclined piece $d'$, adjustably secured to said lever, the cam $e'$, carried by the shaft $D^4$, and a governor mounted directly on the shaft D, and serving to shift the lever $d$ endwise, substantially as herein described.

6. The combination, with the shafts D $D^4$ and the gas-inlet valve C, of the lever $d$, carrying a wedge or incline, the valve-stem $c$, bearing upon but having no other connection with said lever, the cam $e'$ on the shaft $D^4$, and a governor mounted directly on the shaft D, and serving to shift the lever $d$ endwise, substantially as herein described.

7. The combination, with the gas and air inlet valves of a gas-engine and devices for operating them, of a single governor acting upon said devices to regulate the admission of both gas and air, and means for adjusting said air-valve independently of the action of the governor, substantially as and for the purpose herein described.

8. The combination, with the gas-inlet valve C and the air-valve $e^3$, of the lever $d$, carrying an incline or wedge, the shaft $D^4$ and its cam, the lever E, connected with the air-valve $e^3$ and with the lever $d$, the shaft D, carrying the sliding cone $F^2$, and a governor on the shaft D, for shifting said cone, substantially as herein described.

9. The combination of the shaft $D^4$ and its cam $e'$, the lever $d$, with its incline or wedge, the air-valve $e^3$, the lever E, connected at one end with the end of the lever $d$, and the rod $e^4$, connecting the other end of the lever E with the air-valve $e^3$, and made adjustable in length, substantially as herein described.

10. The combination, with the exhaust-valve $h$, having an outwardly-projecting stem, and the shaft D, carrying the cam $h^2$, for operating said valve, of the swinging arm $G'$, interposed between the cam and valve-stem, substantially as herein described.

11. The combination of the exhaust-valve $h$, the shaft D and its cam $h^2$, and the interposed swinging arm G' and its roller $h^3$, substantially as herein described.

12. The combination, with the mixing-chamber of a gas-engine and an air-reservoir connected therewith, and wherein air is contained at the atmospheric pressure, of an exhaust-pipe leading to said reservoir, for heating the air therein by the waste products of combustion while the air is at the atmospheric pressure and before its admixture with the gas, substantially as and for the purpose described.

13. The combination of the mixing-chamber $A^2$, the air-reservoir $A^3$, wherein air is contained at the atmospheric pressure, and the exhaust-pipe G, extending through the air-reservoir, for heating the air while at atmospheric pressure and before its admixture with the gas, substantially as and for the purpose herein described.

14. The combination, with an engine capable of operation by an explosive mixture of gas and air, of an air-reservoir through which air passes to the mixing-chamber of the engine, and wherein the air is at atmospheric pressure, means for heating the air in said reservoir by the waste products of combustion from the engine, and means for delivering water or steam into said reservoir, whereby the air is both heated and saturated while at atmospheric pressure and before its admixture with the gas, substantially as and for the purpose herein described.

15. The combination, with an engine capable of operation by an explosive mixture of gas and air, of an air-reservoir through which air passes to the mixing-chamber of the engine, an exhaust-pipe passing through said reservoir, and another pipe, also entering said reservoir, for discharging water upon said exhaust-pipe, substantially as and for the purpose herein described.

16. The combination, with an engine capable of operation by an explosive mixture of gas and air, and the cylinder of which is surrounded by a water-jacket, of an air-reservoir through which air passes to the mixing-chamber of the engine, wherein the air is at atmospheric pressure, means for heating the air in said reservoir, and a pipe for conducting water from said jacket to said reservoir, for saturating the air therein, whereby the air is both heated and saturated while at atmospheric pressure and before its admixture with the gas, substantially as and for the purpose herein described.

17. The combination, with a gas-engine provided with a water-jacket, of a valve for controlling the flow of water through the jacket, and devices acted upon by the temperature of the water flowing from the jacket for regulating the opening allowed by the valve, substantially as herein described.

18. The combination, with a gas-engine provided with a water-jacket, of a discharge-pipe leading from the jacket, a valve controlling the passage of water through said pipe, and a valve-stem extending through said pipe, fixed at the end opposite the valve, and made of a material having a higher degree of expansion than the section of pipe in which it is arranged, substantially as and for the purpose herein described.

19. The combination, with the engine having a water-jacket, of the discharge-pipe having a section, $H^2$, the valve $j$, and the valve-stem $j'$, made of a metal having a higher degree of expansion than the pipe-section $H^2$, and provided with the screw-thread $j^2$ and head $j^3$, substantially as herein described.

GEO. H. REYNOLDS.

Witnesses:
FREDK. HAYNES,
ED. L. MORAN.

(Model.)
3 Sheets—Sheet 1.
D. B. SPOONER.
METHOD OF AND REGISTERING MECHANISM FOR DETERMINING THE AMOUNT OF THE FLOW OF WATER THROUGH A METER.
No. 287,588.  Patented Oct. 30, 1883.
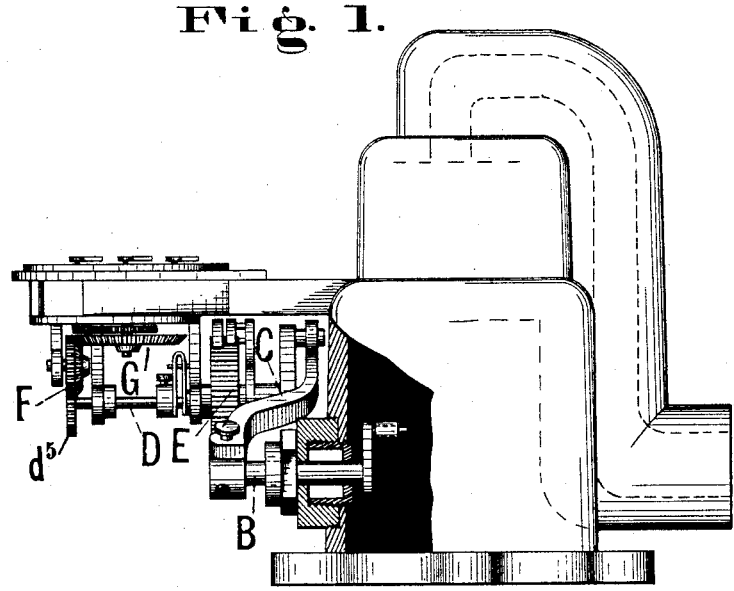
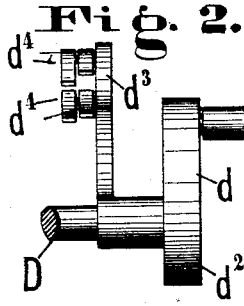
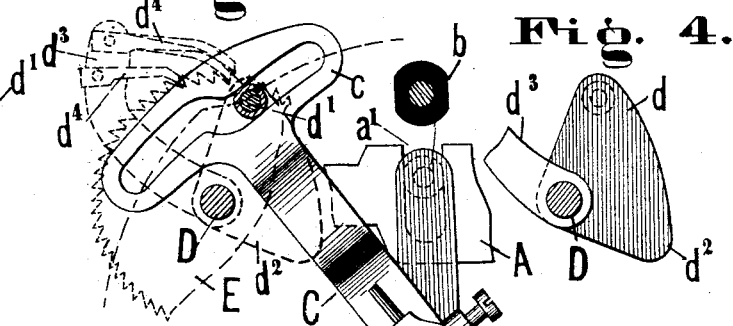
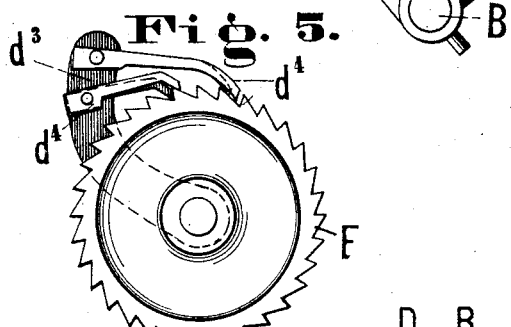
WITNESSES:
T. S. West
Wm. T. Emerson
INVENTOR:
D. B. SPOONER,
BY H. W. Beadle + Co.
ATTYS.